United States Patent [19]

Sedlak

[11] E Re. 28,720

[45] Reissued Feb. 24, 1976

[54] FOOD PLATE SERVICE COVER

[76] Inventor: Mirko S. Sedlak, 1991 Delowe Drive, SW., Atlanta, Ga. 30311

[22] Filed: Oct. 21, 1974

[21] Appl. No.: 516,177

Related U.S. Patent Documents

Reissue of:

[64] Patent No.: 3,815,736
Issued: June 11, 1974
Appl. No.: 207,398
Filed: Dec. 13, 1971

U.S. Applications:

[63] Continuation-in-part of Ser. No. 103,992, Jan. 5, 1971, abandoned.

[52] U.S. Cl. ..... 206/501; 206/508; 206/511; 220/23.83; 220/287; 229/2.5 R

[51] Int. Cl.[2] ..... A47G 19/02; A47G 23/04

[58] Field of Search ..... 206/501, 508, 509, 510, 206/511; 220/287, 23.6, 23.83, 23.86, 380; 229/2.5; 215/10

[56] References Cited

UNITED STATES PATENTS

| | | | |
|---|---|---|---|
| 893,469 | 7/1908 | Essmuller | 215/319 |
| 1,745,935 | 2/1930 | Kirmser | 206/508 |
| 1,800,491 | 4/1931 | Loig | 206/502 |
| 1,863,793 | 6/1932 | Hermani | 220/94 A |
| 2,978,142 | 4/1961 | Novick | 206/508 |
| 3,001,665 | 9/1961 | Tomarin | 206/508 |
| 3,107,027 | 10/1963 | Hong | 229/2.5 |
| 3,516,572 | 6/1970 | Davis | 206/515 |

*Primary Examiner*—George E. Lowrance
*Attorney, Agent, or Firm*—Bailey & Dority

[57] ABSTRACT

A food service cover integrally constructed of a plastic material and including a top portion having radially extending stabilizing arms to hold a food plate stacked thereon and a side wall depending from the peripheral rim of the top portion and having a bottom peripheral lip carrying a protrusion ring to engage the outer rim of a food plate such that the food plate service cover is prevented from sliding on the food plate.

9 Claims, 8 Drawing Figures

FIG. 1
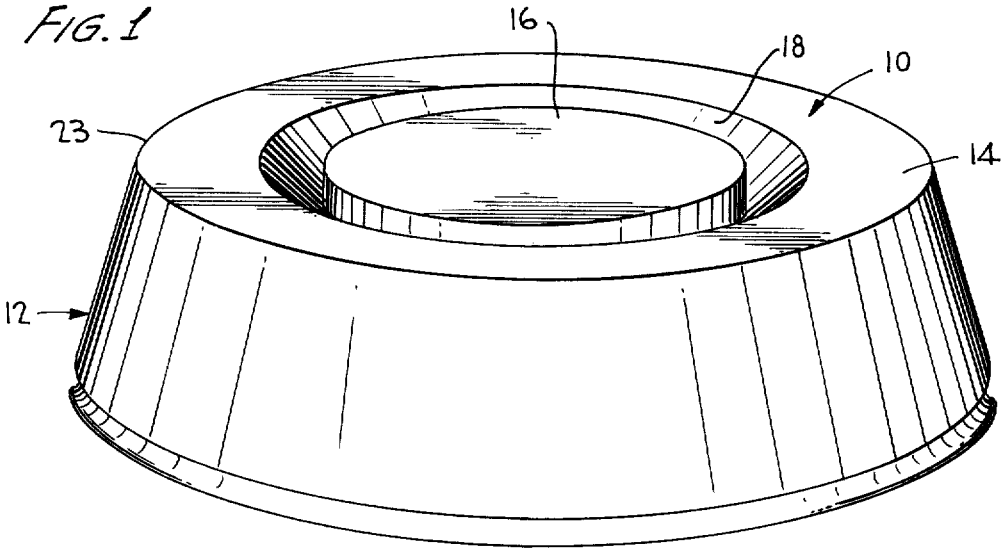
FIG. 2
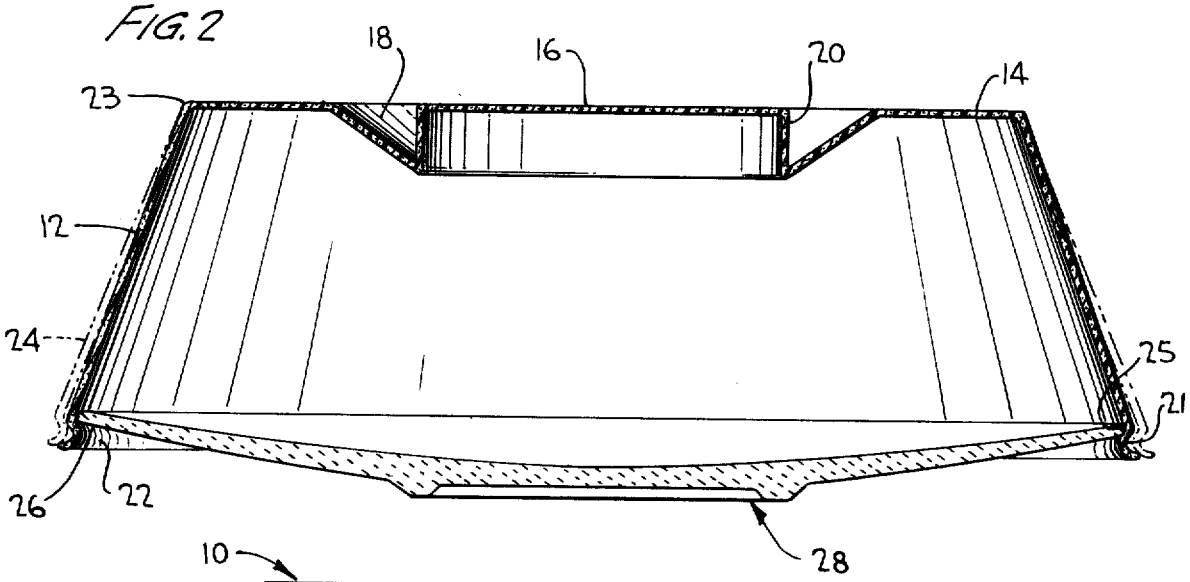
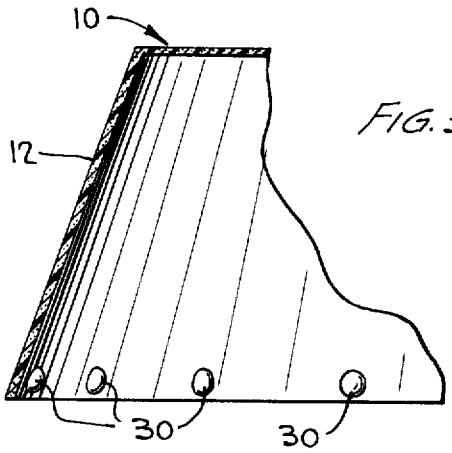
FIG. 3
INVENTOR,
MIRKO S. SEDLAK
BY Sherman & Shalloway
ATTORNEYS

INVENTOR,
MIRKO S. SEDLAK

BY Sherman & Shalloway
ATTORNEYS

INVENTOR,
MIRKO S. SEDLAK
BY Sherman & Shalloway
ATTORNEYS

FOOD PLATE SERVICE COVER

Matter enclosed in heavy brackets [ ] appears in the original patent but forms no part of this reissue specification; matter printed in italics indicates the additions made by reissue.

This application is a continuation-in-part of copending U.S. Pat. application Ser. No. 103,992 filed Jan. 5, 1971, now abandoned.

BACKGROUND OF THE INVENTION

1. Field of the Invention

The present invention pertains to food plate service covers and, more particularly, to such covers which may be inexpensively produced of a plastic material, which engage a food plate to be covered in a non-sliding manner and which may have a food plate stably stacked thereon.

2. Discussion of the Prior Art

Food plate service covers are normally utilized in food service establishments in order to maintain food to be served at its proper temperature and, further, to permit the storage of a great number of platters prior to serving, such as in warmers. The latter use of food plate service covers normally requires the stacking of platters one upon the other to facilitate preparation and serving.

In the past, food plate service covers have conventionally been constructed of materials such as steel, fiberglass, or aluminum. Covers constructed of such materials have the disadvantage of being relatively heavy and expensive and, further, due to the relatively rigid nature of the materials, are subject to sliding relative to the plate. This relative sliding movement is extremely costly, as will be appreciated, in that when platters are stacked upon each other, the sliding of one can cause the toppling of the entire stack.

In the past, attempts have been made to utilize plastic materials for covers for food containers; however, such attempts have culminated only in the provision of covers which are essentially of only two dimensions, with the outer peripheral edge of the cover engaging an upstanding wall of the container. The application of such plastic materials to food plate service covers has been limited basically to applications where heating or cooling liquid is contained within the cover.

The development of a food plate service cover that is inexpensive and yet sufficiently sturdy to permit stacking of food plates has been impeded in that such service covers must be, of necessity, non-sliding relative to the plate, easy to remove, useful with plated of varying dimensions, and must provide sufficient heating and cooling insulation. The problems posed by varying dimensions of plates is particularly acute in that while a normal food plate utilized in a food service establishment is round and has a ten-inch diameter, the diameter often varies slightly and such variance of diameter has tendency to permit the food plate service cover to slide relative thereto.

Known covers having a substantial vertical dimension, such as those for use with cake plates, cannot be utilized as food plate service covers since they are normally not stackable and, further, since they are required to provide an airtight seal with the plate itself, whereas such a seal is not required by food plate service covers, and, as a matter of fact, is not desirable in that the service cover must be easily removable when the food is served.

It will be appreciated that while many covers of plastic resilient materials for food storage have been proposed in the past, such covers, in order to provide a snap, non-sliding engagement with a container, normally require special construction of a lip of the container. Of course, food plate service covers must be utilized with plates having varying edge configurations; and, therefore, the design of the service covers must be of a more general and universal nature. Thus, it can be seen that while a non-sliding fit is desirable, the construction of the service covers must permit use with plates of varying dimensions as well as facilitating removal of the service covers during serving.

A further problem which must be overcome in the provision of an inexpensive food plate service cover is that the food plate itself must be generally flat to facilitate access to the food carried thereon by a customer, and, accordingly, the service cover must be provided with side walls of substantial vertical dimensions to accommodate the food without touching the same and without limiting the normal amount of food to be carried by a plate. Accordingly, the side walls of the service covers must bear substantial weight when platters are stacked thereon, but cannot be overly bulky or rigid.

SUMMARY OF THE INVENTION

Accordingly, it is an object of the present invention to construct a food plate service cover which avoids the above mentioned disadvantages of conventional food plate service covers.

The present invention is generally characterized in a food plate service cover including a top portion having a peripheral rim, a side wall depending from the peripheral rim and having a peripheral bottom lip, and protrusion means formed in the peripheral bottom lip and adapted to engage the underside of the outer rim of a food plate, the food plate service counter being integrally constructed of a plastic material such that the side wall is deformable to engage and disengage the outer rim of the food plate whereby engagement of the outer rim of the food plate by the protrusion means prevents sliding of the food plate service cover relative to the food plate.

Another object of the present invention is to form a disposable food plate service cover integrally of expandable polystyrene resin.

A further object of the present invention is to form a snap ring on the peripheral bottom lip of the side wall of a food plate service cover such that the snap ring is adapted to engage a food plate in a non-sliding manner.

The present invention has another object in that a food plate service cover is constructed to permit use with plates having varying dimensions.

A yet further object of the present invention is to construct a food plate service cover of a plastic material that can withstand repeated servings and washings and is sufficiently flexible to permit deforming of a side wall for snap engagement with a food plate.

Another object of the present invention is to form a food plate service cover of a thermoplastic polycarbonate resin.

The present invention has a further object in that the top portion of a food plate service cover carries a stabilizing surface for engaging the support on the bottom of a food plate in order to stabilize a food plate stacked thereon.

Yet another object of the present invention is to utilize radially extending arms having a plurality of recesses therein on the top portion of a food plate service cover to stabilize a food plate stacked thereon.

Some of the advantages of the present invention over the prior art are that food plate service covers formed of a rigid thermoplastic resin foam in accordance with the present invention are less expensive than hand washing of conventional covers and are therefore economically disposable, the food plate service covers of the present invention are extremely light in weight thereby reducing by a great amount the weight of a tray upon which a plurality of platters are carried, and the food plate service covers of the present invention prevent sliding and reduce breakage and replaced food costs.

Other objects and advantages of the present invention will become apparent from the following description of the preferred embodiments taken in conjunction with the accompanying drawings.

BRIEF DESCRIPTION OF THE DRAWINGS

FIG. 1 is a perspective view of a food plate service cover constructed in accordance with the present invention.

FIG. 2 is a side elevation in section of the food plate service cover of FIG. 1 in engagement with a food plate.

FIG. 3 is a broken side elevation in section of a modification of the food plate service cover of FIG. 1.

DESCRIPTION OF THE PREFERRED EMBODIMENTS

Figure 4:
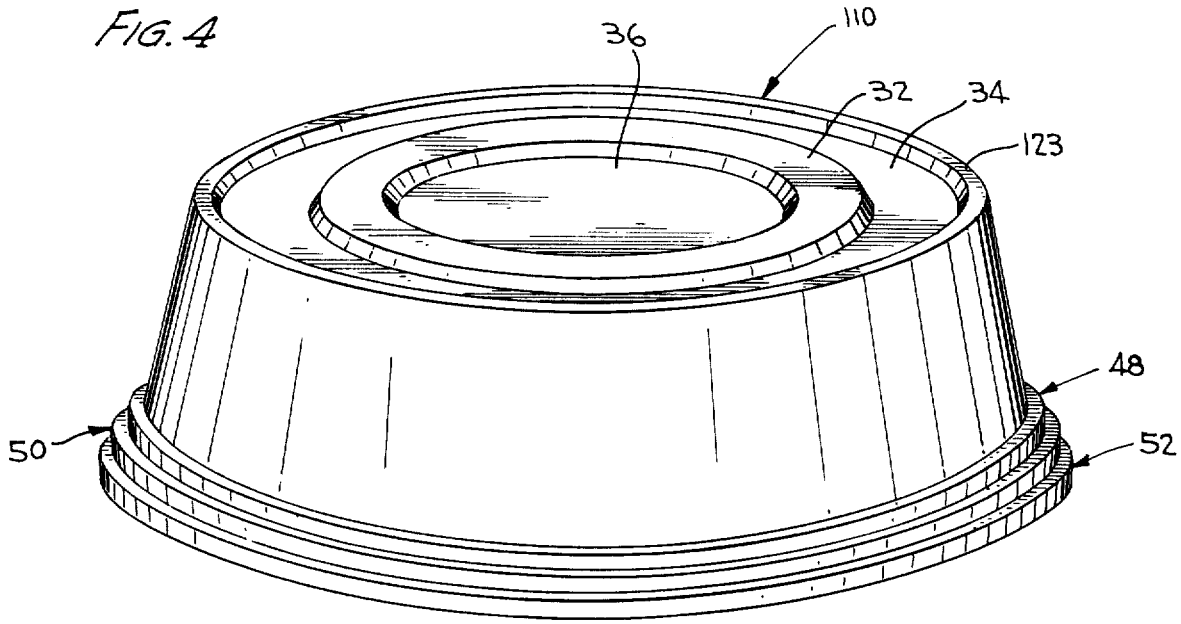
FIG. 4 is a perspective view of another embodiment of the food plate service cover in accordance with the present invention.

A food plate service cover constructed in accordance with the present invention is illustrated in FIG. 1 and includes a top portion generally indicated at 10 and a side wall 12 depending therefrom. The food plate service cover is preferably integrally constructed of a plastic material such as a rigid thermoplastic resin foam, for example, expandable polystyrene, a thermoplastic polycarbonate resin or other plastic of similar consistency; and, as will be appreciated from the following description, the material utilized to form the food plate service cover must essentially comply with two basic requirements. That is, the material must be inexpensive and permit the inexpensive production of food plate service covers, and the material must be sufficiently resilient to permit the peripheral lip of the side wall 12 to be deformed to engage and disengage a food plate. The use of a rigid thermoplastic foam is preferred for disposable food plate service covers whereas a rigid thermoplastic polycarbonate resin, such as Lexan produced by the General Electric Company, is preferred for reuseable food plate service covers.

Top portion 10 of the food plate service cover includes an outer annular flat surface 14 and a circular flat surface 16 disposed concentrically within and aligned with annular surface 14. An angular wall 18 is disposed between surfaces 14 and 16 and terminates at a vertically extending wall 20 which extends to the peripheral edge of surface 16. Annular surface 14 has an outer peripheral edge 23 from which depends side wall 12 which has a truncated conical configuration and extends outwardly as well as downwardly from top portion 10. The bottom lip of side wall 12 is provided with an external peripheral recess 21 which defines a protrusion or snap ring 22 extending inwardly from a contact portion 25 on the inner surface of side wall 12.

As illustrated in FIG. 2, the food plate service cover is mounted on a plate by slightly deforming side wall 12, as indicated at dashed lines 24, such that the inner diameter of ring 22 is expanded sufficiently to permit it to move past the outer rim 26 of a round food plate 28. It will be appreciated that the upper portion of protrusion ring 22 engages the under surface of the outer rim 26 of food plate 28 around the entire circumference thereof to thereby prevent any sliding of the food plate service cover relative to the plate. The outer edge of rim 26 of plate 28 engages contact portion 25, and the conical configuration of side wall 12 prevents vertical movement of the food plate service cover relative to the plate 28.

The food plate service cover may be easily mounted on plate 28 by merely positioning the service cover such that ring 22 abuts the rim 26 of the plate and then forcing the service cover toward the plate to deform side wall 12, as shown at 24, to permit ring 22 to be expanded and snap under rim 26 to engage the under surface thereof. It will be appreciated that when the service cover is positioned as shown in FIG. 2, it will not slide relative to plate 28 since ring 22 extends entirely around the circumference thereof.

The design of top portion 10 of the service cover may be varied in order to accommodate the support legs of food plates for use with the service covers. That is, surfaces 14 and 16 may be varied in size to stabilize food plates to be stacked thereon. The design of the top portion 10, as illustrated in FIG. 10, has several important advantages, however, in that the deep recess formed by walls 18 and 20 provides added strength to the service cover to increase the weight that may be supported thereby, such as by way of stacked plates, and also permits the cylinder formed by surface 16 and wall 20 to be utilized as a handle or grip to facilitate handling of the service cover and removal of the service cover from plate 28. Dependent upon the weight of the plate 28, the service cover may be removed by either grasping the grip formed by the recess in top portion 10 and pulling the service cover from the plate to deform the side wall or the bottom peripheral lip of the side wall may be deformed by grasping with the fingers and pulling outwardly to deform the side wall and release the plate from engagement with snap ring.

A modification of the food plate service cover of FIG. 1 is partially illustrated in FIG. 3 with the primary difference between the embodiments of FIGS. 1 and 3 being that instead of the circumferential protrusion or snap ring 22 of FIG. 1, a plurality of semispherical protrusions or buttons 30 are utilized to hold the food plate service cover in place on the plate 28. The modified service cover of FIG. 3 may be mounted on a food plate in the same manner as the service cover of FIG. 1. That is, the side wall 12 is deformed such as by pressure to permit the protrusions 30 to snap under the rim of the plate and engage the under surface thereof.

Figure 5:
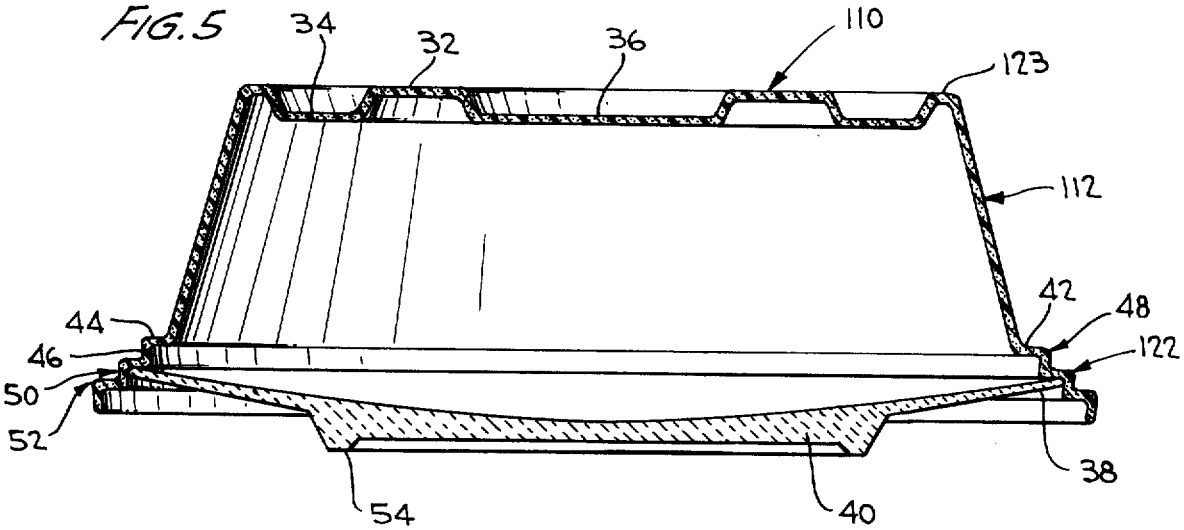
FIG. 5 is a side elevation in section of the food plate service cover of FIG. 4 in engagement with a food plate.

Another embodiment of a food plate service cover in accordance with the present invention is illustrated in FIGS. 4 and 5 and parts in the embodiment of FIGS. 4 and 5 similar to parts in the embodiment of FIGS. 1 and 2 are given identical reference numbers with 100 added.

The primary differences in the service cover of FIGS. 4 and 5 as compared with the service cover of FIGS. 1 and 2 are that the top portion 110 has a different configuration and the protrusion means carried at the bottom peripheral lip of side wall 112 is provided with a plurality of snap rings to permit the service cover to be utilized with food plates having varying diameters.

The top portion 110 includes an outer peripheral ridge 123 and an annular strengthening rib 32 concentrically disposed within ridge 123 to define an outer support surface 34 therebetween and a circular surface 36 in the center of top portion 110.

Side wall 112 depends from ridge 123 and has a truncated conical configuration extending outwardly as well as downwardly from top portion 110. The bottom peripheral lip of side wall 112 is formed to provide a plurality of protrusion or snap rings 122 to engage the outer rim 38 of a plate 40 as will be described hereinafter. Side wall 112 is offset at 42 to define a horizontal annular contact portion 44, and portion 44 has an annular wall or riser 46 extending downwardly from the outer edge thereof and preferably at a slight angle toward the center of the service cover. Contact portion 44 and wall 46 form a first protrusion or snap ring 48 to receive the outer rim of a plate.

A protrusion or snap ring 50 having a diameter greater than the diameter of snap ring 48 is formed at the bottom edge of wall 46 by an annular contact portion and an inwardly extending wall in the same manner, and a third protrusion or snap ring 52 having a diameter greater than the diameter of ring 50 is formed below ring 50 in the same manner. Snap rings 48, 50 and 52 are concentrically aligned with their outer surfaces forming a step-like configuration.

In FIG. 5, the service cover is illustrated as being mounted on plate 40 utilizing snap ring 50, however, it will be appreciated that if the diameter of plate 40 were slightly less than that illustrated, snap ring 48 could be utilized in mounting the service cover on the plate. Similarly, if the diameter of plate 40 were greater than that illustrated, snap ring 52 could be utilized to mount the service cover on the plate.

The slightly inward orientation of the wall or riser 46 of each snap ring 48, 50 and 52 provides resilient snap action required to securely hold the service cover in position on plate 40. The configuration of top portion 110 of the service cover provides strength due to rib 132 and peripheral ridge 123 and the configuration of support surface 34 defined therebetween is designed to mate with an annular support leg 54 formed on the bottom of a food plate 40 to be stacked thereon.

Thus, it will be appreciated that when stacking the food plate 40 on the service cover, leg 54 will be received by support surface 34 to limit shifting of the plate relative to the service cover. Accordingly, the configuration of top portion 110 stabilizes stacked food plates as well as strengthening the service cover to increase the weight that can be supported thereon.

The service cover of FIGS. 4 and 5 may be mounted and removed from plate 40 in the same manner as previously described with respect to the service covers of FIGS. 1 and 2 and is similarly integrally constructed of a plastic material.

Figure 6:
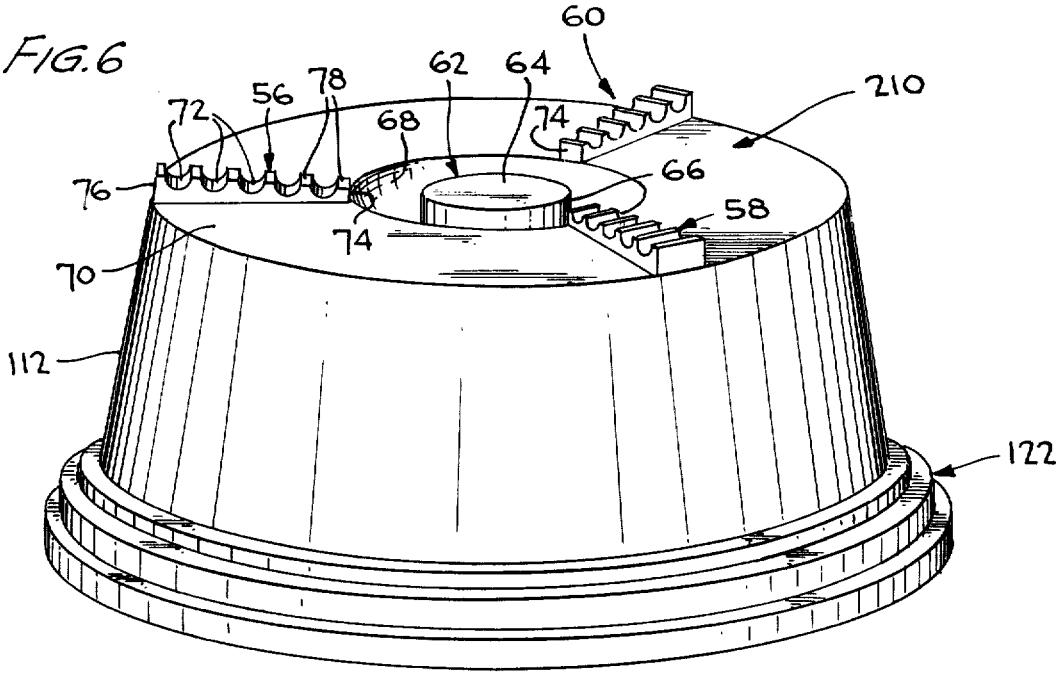
FIG. 6 is a perspective view of a further embodiment of the food plate service cover in accordance with the present invention.
Figure 7:
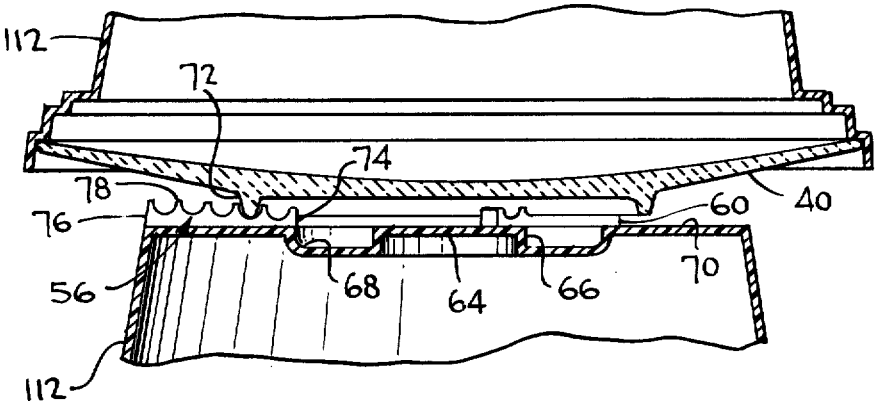
FIG. 7 is a side elevation in section of the food plate service cover of FIG. 6 with a food plate stacked thereon.

A further embodiment of a food plate service cover in accordance with the present invention is illustrated in FIGS. 6 and 7, and parts of the embodiment of FIGS. 6 and 7 similar to parts of the embodiment of FIGS. 4 and 5 are given identical reference numbers with 100 added while identical parts are given identical reference numbers and are not described again.

The primary difference in the food plate service cover of FIGS. 6 and 7 as compared with the food plate service cover of FIGS. 4 and 5 is that the top portion 210 is provided with equally spaced, radially extending arms 56, 58 and 60 in order to stabilize a food plate 40 stacked thereon.

A cylindrical handle or grip 62 is formed by a horizontal surface 64 and a vertically extending wall 66, similar to the embodiment of FIGS. 1 and 2, in order to facilitate gripping of the service plate for removal from a food plate, and an annular channel 69 is formed around grip 62 in order to strengthen the top. Channel 68 accurately terminates at an annular flat surface 70 which extends to the periphery of the top portion 210 of the service cover and is aligned with surface 64. Equally spaced radially extending arms 56, 58 and 60 are carried on surface 70 and extend upwardly therefrom. The radially extending arms are identical; and, accordingly, only arm 56 will be described in detail.

Arm 56 is formed with a plurality of arcuate recesses 72 therein with the longitudinal axis of the recesses 72 being tangentially disposed relative to the top portion 210. That is, the longitudinal axis of the arcuate recesses 72 are disposed transverse to a radius of the top portion 210. Arm 56 has an inner edge 74 aligned with the arcuate wall forming the outer boundry of channel 68 and an outer edge 76 aligned with side wall 112. The height of outer edge 76 is greater than the height of inner edge 74 such that the upper surface of arm 56, as defined by flat topped ridges 78 between recesses 72, slopes downwardly toward the center of the top portion 210.

Side wall 112 has a truncated conical configuration and extends outwardly and downwardly from top portion 210. Similar to the embodiment of FIGS. 4 and 5, the bottom peripheral lip of side wall 112 is formed to provide a plurality of protrusion or snap rings 122 to engage the outer rim of a food plate.

As illustrated in FIG. 7, the side wall 112 may be deformed in order to engage the outer peripheral edge of a food plate 40 in the same manner as previously discussed with respect to the embodiment of FIGS. 4 and 5, and a food plate 40 may be stacked upon the service cover in a stabilized manner in that the dependeng leg of the food plate will engage the recesses 72 in radially extending arms 56, 58 and 60. The scalloped configuration of the recesses 72 in the radially extending arms coupled with the slope of the arms downwardly towards the center of the service plate permit the food stacked thereon to be held with minimum sliding.

Figure 8:
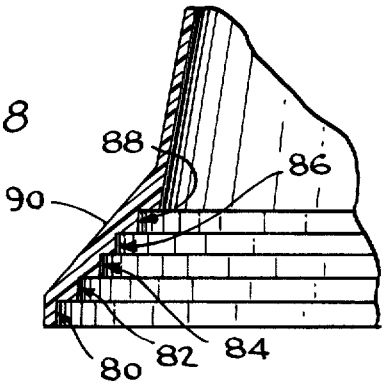
FIG. 8 is a broken section of a modification of the food plate service cover of the present invention.

A modification of the bottom peripheral lip of the embodiments of FIGS. 4, 5, 6 and 7 is illustrated in FIG. 8 wherein snap rings 80, 82, 84, 86 and 88 are formed by annular contact portions and risers in the same manner as the snap rings of the embodiment of FIGS. 4 and 5 but with smaller diameters in order to provide more precise engagement with the outer rim of food plates of varying diameters. The outer surface 90 of the bottom peripheral lip has a smooth truncated conical configuration such that the thickness of the bottom peripheral lip is increased to provide a corresponding increase in strength for the food plate service cover. That is, the increased thickness of the bottom peripheral lip provides additional stacking capability and resistance to sliding on a food plate.

From the above it can be seen that the food plate service covers of the present invention provide a stable and insulative cover for use by food service establishments to their great benefit in that the service cover can be inexpensively produced to permit the establishment to dispose of the service cover after a single use or can be manufactured of more long lasting materials while retaining sufficient flexibility to permit non-slipping engagement with a food plate. Furthermore, the design of the top portions of the service covers can accommodate a label or other suitable indica in the center thereof so as to be prominently displayed, and the weight of the service covers of the present invention is reduced to decrease the weight to be carried by service personnel. The use of a rigid plastic material permits gripping of the outer rim of a food plate by slight deformation of the side wall of the food plate service cover, and the use of various diameter snap rings decreases inventory of food plate service covers since a single food plate service cover can be utilized with food plates of varying dimensions. The structure of the top portions of the food plate service covers increases stacking strength as well as stabilizing food plates stacked thereon. Of course, the food plate service covers of the present invention may be provided with other configurations dependent upon the configuration of food plates to be covered such as food plates which are oval or slightly out of round.

Inasmuch as the present invention is subject to many variations, modifications and changes in detail, it is intended that all matter described above or shown in the drawings be interpreted as illustrative and not in a limiting sense.

What is claimed is:

1. A food plate service cover comprising a top portion having a peripheral rim, a side wall depending from said top portion and having a bottom peripheral lip, and protrusion means extending inwardly from said bottom peripheral lip and adapted to engage the under surface of an outer rim of a food plate service cover being integrally formed from a rigid plastic material such that said side wall is deformable to engage and disengage the outer rim of the food plate whereby engagement of the outer rim of the food plate by said protrusion means prevents sliding of said food plate service cover relative to the food plate, said peripheral lip of said side wall including a first annular contact portion adapted to engage the upper surface of the outer rim of the food plate and said protrusion means including a first annular wall extending downwardly from the outer edge of said contact portion and adapted to engage the side surface of the outer rim of the food plate, said first contact portion and said first wall defining a first snap ring, a second annular portion extending outwardly from said first annular wall and said protrusion means including a second annular wall extending downwardly from the outer edge of said second contact portion, said second contact portion and said second wall defining a second snap ring having a diameter greater than the diameter of said first snap ring, a third annular contact portion extending outwardly from said second annular wall and said protrusion means including a third annular wall extending downwardly from the outer edge of said third contact portion, said third contact portion and said third wall defining a third snap ring having a diameter greater than said second snap ring, said top portion including stabilizing means sloping downwardly from said peripheral rim toward the center of said top portion to define a surface for receiving a stacked food plate wherein said stabilizing means includes a plurality of radially extending arms, each of said arms having a plurality of radially spaced recesses in the upper surfaces thereof.

2. The food plate service cover as recited in claim 1 wherein said plurality of radially extending arms are equally angularly spaced.

3. The food plate service cover as recited in claim 1 wherein said plastic material is a thermoplastic polycarbonate resin.

4. A food plate service cover comprising a round top portion having a peripheral rim, and a side wall depending from said peripheral rim having a bottom peripheral lip adapted to engage a food plate, said top portion having stabilizing means disposed thereon having an upper surface sloping downwardly from said peripheral rim toward the center of said top portion whereby sliding of a food plate stacked on said food plate service cover is reduced, said stabilizing means including a plurality of radially extending arms, wherein each of said arms has a plurality of radially spaced recesses in the upper surfaces thereof to receive a depending leg of the stacked food plate.

5. The food plate service cover as recited in claim 4 wherein said top portion includes a centrally disposed cylindrical handle and an annular recess surrounding said handle, said radially extending arms being disposed between said annular recess and said peripheral rim.

6. The food plate service cover as recited in claim 4 wherein said food plate service cover is integrally formed of a thermoplastic polycarbonate resin.

*7. A food plate service cover comprising a round top portion having a peripheral rim, and a side wall depending from said peripheral rim having a bottom peripheral lip adapted to engage a food plate, said top portion having stabilizing means disposed thereon and having an upper surface extending inwardly from said peripheral rim toward the center of said top portion whereby sliding of a food plate stacked on said food plate service cover is reduced, said stabilizing means including three circumferentially spaced radially extending means, each defining a plurality of radially spaced recesses therein to receive a portion of the stacked food plate.*

*8. The structure set forth in claim 7 wherein said radially extending means are equally spaced, and wherein said upper surface slopes downwardly from said peripheral rim toward the center of said top portion.*

*9. The structure set forth in claim 8 wherein said food plate service cover is integrally formed of a polycarbonate resin.*

* * * * *